US012802095B2

(12) United States Patent
Sundaresan

(10) Patent No.: US 12,802,095 B2
(45) Date of Patent: Nov. 17, 2026

(54) SYSTEMS AND METHODS FOR ON DEMAND LOCAL COMMERCE

(71) Applicant: eBay Inc., San Jose, CA (US)

(72) Inventor: Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 52 days.

(21) Appl. No.: 18/983,246

(22) Filed: Dec. 16, 2024

(65) Prior Publication Data

US 2025/0117819 A1 Apr. 10, 2025

Related U.S. Application Data

(63) Continuation of application No. 18/119,428, filed on Mar. 9, 2023, now Pat. No. 12,205,130, which is a (Continued)

(51) Int. Cl.
*G06Q 30/00* (2023.01)
*G06Q 30/02* (2023.01)
(Continued)

(52) U.S. Cl.
CPC ......... *G06Q 30/0205* (2013.01); *G06Q 30/02* (2013.01); *G06Q 30/0261* (2013.01); (Continued)

(58) Field of Classification Search
CPC ............... G06Q 30/0205; G06Q 30/02; G06Q 30/0261; G06Q 30/0623; G06Q 30/0631; (Continued)

(56) References Cited

U.S. PATENT DOCUMENTS 7,487,112 B2 * 2/2009 Barnes, Jr. ............. G06Q 10/02 709/204
7,979,316 B2 * 7/2011 Coelho .............. G06Q 30/0601 705/26.1

(Continued)

OTHER PUBLICATIONS

"An Economically Viable Solution to Geofencing for Mass-Market Applications," by Amie Greenwald, Georg Hampel, Chitra Phadke, and Viswanath Poosala, Bell Labs Technical Journal 16(2), 21-38 (2011) (Year: 2011).*

(Continued)

*Primary Examiner* — Anne M Georgalas
(74) *Attorney, Agent, or Firm* — FIG. 1 Patents

(57) ABSTRACT

Systems and methods for on demand local commerce are described. One example embodiment includes a device gathering location information and product interest associated with clients and client devices. The system may use location information in determining that the first plurality of client devices are within a first geographic area during a first time period, and may further use the interest information in calculating an interest level for a first product. A threshold may be identified and used in determining that the interest level for the first product exceeds the threshold. When the calculated interest level exceeds the threshold, a local commerce action is initiated. In various embodiments, the local commerce action may be a live on demand auction at a particular location, an offer associated with a geofenced area, a sales location recommendation to a merchant, or any other such local commerce action.

20 Claims, 10 Drawing Sheets

Related U.S. Application Data continuation of application No. 17/328,577, filed on May 24, 2021, now Pat. No. 11,620,666, which is a continuation of application No. 16/437,864, filed on Jun. 11, 2019, now Pat. No. 11,093,961, which is a continuation of application No. 14/530,527, filed on Oct. 31, 2014, now Pat. No. 10,366,402.

(51) Int. Cl.

| | |
|---|---|
| ***G06Q 30/0204*** | (2023.01) |
| ***G06Q 30/0251*** | (2023.01) |
| ***G06Q 30/0601*** | (2023.01) |
| ***G06Q 30/08*** | (2012.01) |
| ***H04L 67/52*** | (2022.01) |
| ***H04W 4/021*** | (2018.01) |

(52) U.S. Cl.

CPC ..... *G06Q 30/0623* (2013.01); *G06Q 30/0631* (2013.01); *G06Q 30/0639* (2013.01); *G06Q 30/0641* (2013.01); *G06Q 30/08* (2013.01); *H04L 67/52* (2022.05); *H04W 4/021* (2013.01)

(58) Field of Classification Search

CPC ........... G06Q 30/0639; G06Q 30/0641; G06Q 30/08; H04L 67/52; H04W 4/021

See application file for complete search history.

(56) References Cited

U.S. PATENT DOCUMENTS

| | | | | | |
|---|---|---|---|---|---|
| 8,255,288 | B1 * | 8/2012 | Gupta | G06Q 30/06 | 705/26.1 |
| 8,650,072 | B2 * | 2/2014 | Mason | H04W 4/029 | 705/14.1 |
| 8,661,151 | B2 * | 2/2014 | Sharkey | G06F 16/40 | 709/231 |
| 8,892,082 | B2 * | 11/2014 | Bi | H04L 67/303 | 455/411 |
| 2001/0049636 | A1 * | 12/2001 | Hudda | G06Q 30/0601 | 705/26.1 |
| 2005/0039136 | A1 * | 2/2005 | Othmer | G06F 16/9577 | 715/831 |
| 2011/0029385 | A1 * | 2/2011 | Engel | H04M 15/00 | 345/173 |
| 2011/0207440 | A1 * | 8/2011 | Ruuspakka | G06Q 30/0261 | 455/414.1 |
| 2011/0302117 | A1 * | 12/2011 | Pinckney | G06N 5/048 | 706/12 |
| 2012/0109751 | A1 * | 5/2012 | Binenstock | G06Q 30/0267 | 705/14.58 |
| 2013/0321466 | A1 * | 12/2013 | Kocienda | G01C 21/3682 | 345/635 |
| 2014/0052527 | A1 * | 2/2014 | Roundtree | G06Q 30/0245 | 705/14.44 |
| 2014/0156381 | A1 * | 6/2014 | Monsees | G06Q 30/0244 | 705/14.43 |
| 2015/0100449 | A1 * | 4/2015 | Garcia | G06Q 30/08 | 705/26.3 |

OTHER PUBLICATIONS

"GeoXmart—A Marketplace for Geofence-Based Mobile Services," by Ulrich Bareth and Peter Ruppel, 2010 34th Annual IEEE Computer Software and Applications Conference (Year: 2010).*

"U.S. Appl. No. 18/119,428, Examiner Interview Summary mailed Mar. 6, 2024", 2 pgs.

"U.S. Appl. No. 18/119,428, Examiner Interview Summary mailed Jun. 14, 2024", 2 pgs.

"U.S. Appl. No. 18/119,428, Non Final Office Action mailed Apr. 11, 2024", 28 pgs.

"U.S. Appl. No. 18/119,428, Notice of Allowance mailed Sep. 17, 2024", 21 pgs.

"E-commerce Ventures into the Outernet", ChainStorage.com, (Aug./Sep. 2013), 2 pages.

* cited by examiner

900

SYSTEMS AND METHODS FOR ON DEMAND LOCAL COMMERCE

CLAIM OF PRIORITY

This application is a continuation of U.S. application Ser. No. 18/119,428, filed Mar. 9, 2023, which is a continuation of U.S. application Ser. No. 17/328,577, filed May 24, 2021, which is a continuation of U.S. application Ser. No. 16/437,864, filed Jun. 11, 2019, which is a continuation of U.S. application Ser. No. 14/530,527, filed Oct. 31, 2014, each of which is hereby incorporated by reference in its entirety.

TECHNICAL FIELD

This application relates generally to geofencing, live auction systems, and local commerce within a network-based system operating over a distributed network with networked mobile devices, and more specifically to systems and methods for automatically deploying on demand live auctions and local commerce in response to analysis of client location and interest data.

BACKGROUND

The ever-increasing use of smart phones with data connections and location determination capabilities is slowly changing the way people interact, shop for products and services, and manage accounts. Smart phones can provide clients with nearly instant information regarding a wide range of information, such as product availability, pricing, or locations of friends. Smart phones also commonly include mechanisms, such as global positioning system (GPS) receivers, that allow the devices to constantly update location information. These technology changes are also driving changes in the way merchants interact with customers.

BRIEF DESCRIPTION OF THE DRAWINGS

Some embodiments are illustrated by way of example and not limitation in the figures of the accompanying drawings in which.

DETAILED DESCRIPTION

Figure 1:
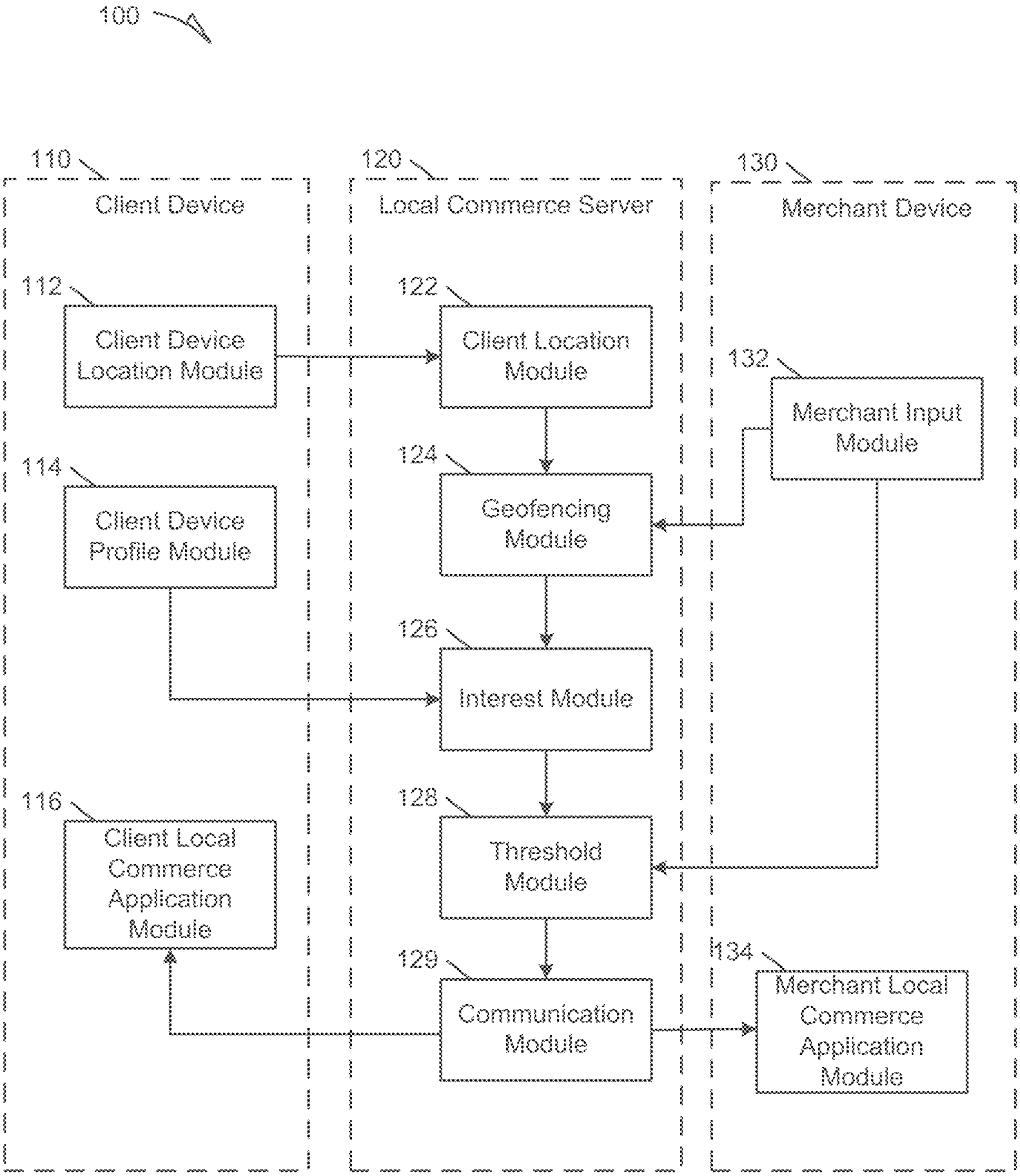
FIG. 1 is a block diagram depicting a system for on demand local commerce and local auctions, in accordance with one example embodiment.

Example systems and methods are described for using geofencing and customer interest information to implement live auction and local commerce within a network-based system operating over a distributed network with networked mobile devices. In particular, example embodiments show systems and methods for automatically deploying on demand live auctions and other such local commerce actions in response to analysis of client location and interest data.

For example, in one embodiment, an art gallery may have a painting for sale by a local artist. The art gallery may provide geofencing and product interest threshold information to a local commerce server. The geofencing threshold information may define one or more geographic areas including a public park near an art gallery location. The product interest threshold information may define an interest level from potential clients that will be used to trigger a local commerce action or message.

Clients may have an application operating on their devices that provides location information to the local commerce server. Additionally, the clients may provide interest information to the local commerce server through a registration process or via the application. The local commerce server gathers location information and interest information and compares this to the threshold information received from the art gallery. If, for example, 15 devices are identified within the geofenced area and 8 of the devices have expressed an interest in art auctions for local artists, the local commerce server may automatically initiate a live auction for the painting. The local commerce server may then notify the art gallery that the threshold conditions have been met for an auction. The local commerce server may then also message any devices within the geofenced area of the location, start time, and item associated with the on demand live auction. The local commerce server may further manage messaging updates between clients and the art gallery. When the auction begins, the local commerce server may enable auction bids to be placed via clients' mobile devices.

In other example embodiments, rather than an on demand local auction being initiated, the local commerce server may simply notify a merchant of the threshold interest, and the merchant may use this information to travel to a location within the geofenced area and set up an on demand local store that may be online or offline. An offline on demand local store may be, for example, a booth at a temporary open air market, a mobile food truck, a sidewalk sale, an informal auction in a public place, or other such in person commerce environments. In further embodiments, the local commerce server may automatically issue a conditional offer associated with the geofenced area, such as an offer to deliver products to the geofenced area if a certain number of the products are purchased within a certain time period. Other embodiments will be apparent from the detailed descriptions provided herein.

For the purposes of this specification, the term "location" is used to refer to a geographic location, such as a longitude/latitude combination, a street address, or a defined area. As described herein, a location, location value, or location information may have associated uncertainty due to time delays and device movement, error in measurements, or other such sources of uncertainty. The term location is also used within this specification in reference to a physical location, building, or area associated with a merchant, an event, or other similar physical destination.

For the purposes of this specification and the associated claims, the term "real-time" is used to refer to calculations or operations performed on the fly as events occur or input is received by the operable system. However, the use of the term "real-time" is not intended to preclude operations that cause some latency between input and response, so long as the latency is an unintended consequence induced by the performance characteristics of the machine.

For the purposes of this specification and the associated claims, the term "geofence" is used to refer to various regions or boundaries of interest that include a geographic area within a distance or travel time to a point of interest. However, a geofence need not be limited to any geometric shape or an arbitrary boundary drawn on a map. Geofences can be defined in terms of GPS coordinates (e.g., latitude and longitude) combined with a radius measured in meters or feet, for example. Alternatively, geofences can also be defined according to a series of GPS coordinates defining a bounding box. In yet other examples, a geofence can be any geometric shape defined by a mathematical formula and anchored by a GPS coordinate. Other methods of defining, maintaining, and using geofences can be used without limitation with the systems and methods discussed herein. In certain examples, the geofence may not be centered on a particular point or fixed coordinate, but rather allowed to float within a defined geographic area. In these examples, the defined float geography can be centered or otherwise dynamically tied to one or more points of interest (POIs), in order to provide flexibility to a merchant for merchant thresholds. For example, a merchant may define a geofence as being any two block radius within a 20 block area of a city, and the merchant may have interest thresholds associated with the floating two block radius geofence.

In other examples, the size or shape of a geofence may be dynamically configured to shift over the course of a day or some other time period. For example, between the hours of 10:00 AM and 4:00 PM, a geofence may be set to a first area; between 4:00 PM and 6:00 PM, the geofence may dynamically adjust to a second area; and from 6:00 PM to 10:00 AM, the geofence may be set to a null area to indicate that no threshold is associated with that time period. In this example, the dynamic geofence may change in size depending upon time of day. For example, a geofence may grow smaller during commute times when travel is slower and may expand during times when travel is less congested and it is easier and quicker for a potential client to get to a commerce site.

For the purpose of this specification, the term "product" refers to any goods, services, licenses, or other objects of a sales transaction that may be offered by a merchant to a client.

FIG. 1 is a block diagram depicting a system 100 for on demand local commerce and local auctions, in accordance with one example embodiment. The example embodiment of FIG. 1 includes client device 110, local commerce server 120, and merchant device 130. In general, local commerce server 120 gathers client location information and interest information from client device 110. Local commerce server 120 also gathers input information from merchant device 130. This input information from merchant device 130 is used to set thresholds that define when local commerce actions and communications will be initiated by local commerce server 120. Such actions are initiated when the location and interest information from client devices reach a threshold level that is determined from the merchant input information.

While the system 100 includes a single client device 110, a single local commerce server 120, and a single merchant device 130, in various embodiments of the system 100, any number of client devices such as client device 110, local commerce servers such as local commerce server 120, or merchant devices or servers such as merchant device 130 may be part of a system. In certain embodiments, a single local commerce server will interact with hundreds or thousands of client devices and multiple merchant devices. In other embodiments, the local commerce server structure described by local commerce server 120 and the structure of merchant device 130 may be integrated into a single device if the local commerce server is being operated by the merchant. In still further embodiments, the system may use multiple local commerce servers. This may particularly occur if a local commerce server is dedicated to a particular geographic area or a set of geographic areas. In such embodiments, large areas may be covered by multiple local commerce servers with each local commerce server covering a particular subarea.

The communication relationships between client device 110, local commerce server 120, and merchant device 130 may be established by registration processes. Such processes may involve separate registration for a client and merchant. A client may register multiple client devices such as client device 110 with an account that is created to provide local commerce information to the client via the client's devices. Similarly, a merchant that wishes to engage in local commerce activities with the assistance of a local commerce server such as local commerce server 120 may register with local commerce server 120 and provide information about products, commerce times, and threshold requirements related to local commerce activities that the merchant associated with merchant device 130 will support. The registration process may also involve communication or downloading of applications, software elements, instruction sets, and the like to client device 110 and merchant device 130 as part of their respective registration processes. This information is received by client device 110 and merchant device 130 and may be used as part of the modules operating on these respective devices to implement local commerce as described herein. In certain embodiments, this information may be provided directly by local commerce server. In other embodiments, this information may be provided by separate web portals, application servers, or other such network resources. These registration processes may also be used to generate records at local commerce server 120 identifying client devices and merchant devices, which will be used by the local commerce server 120 as described in more detail further below.

Client device 110 includes client device location module 112, client device profile module 114, and client local commerce application module 116. Local commerce server 120 includes client location module 122, geofencing module 124, interest module 126, threshold module 128, and local commerce communication module 129. Merchant device 130 includes merchant input module 132 and merchant local commerce application module 134.

Client devices such as client device 110 are associated with a particular client, a client account that is associated with multiple client devices, or other such client device configurations. Client device location module 112 may be one or more systems that are part of client device 110 for determining a location of client device 110 and sharing that location with networked computers such as local commerce server 120. Client device location module 112 may include GPS receivers, processors for calculating a local position, network based location service systems, and other hardware and software systems that may be used to calculate or estimate a location of client device 110. Client device location module 112 may periodically send a location update to local commerce server 120 as part of client device 110 system operation, or as part of an application operating on client device 110 such as client local commerce application module 116. In various embodiments of a client device, the systems for communicating client device locations to a local commerce server may be structured in various different ways.

Client device profile module 114 accepts interest, preference, profile, or other such information provided by a user of the client device 110 that may be used by local commerce server 120 and a merchant associated with merchant device 130 to identify local commerce opportunities that may interest a client of client device 110. Such information may be gathered by a client interface presented on client device 110 as part of operation of an application that includes client device profile module 114. This information may be gathered as part of a registration process with a local commerce server 120 or may be communicated to local commerce server 120 as part of system or application operation after a client registration.

Client local commerce application module 116 operates an interface in communication between a client of client device 110 and the local commerce server 120. While client device location module 112 and client device profile module 114 may operate on the background of client device 110 in response to or following an initial client set up, client local commerce application module 116 presents an active communication interface with the client of client device 110; thus, client local commerce application module 116 may enable local commerce server 120 to communicate local commerce opportunities or offers to a client of client device 110. For example, after the local commerce server 120 has determined in conjunction with information from merchant device 130 that an offer is available based on a location of client device 110, client local commerce application module 116 may receive a communication from local commerce server 120 regarding the offer or local commerce opportunity, and may present this information to a client of client device 110 via an output device of client device 110. Client local commerce application module 116 may also accept client inputs via an input device of client device 110 to enable a client of client device 110 to accept an offer or express further interest in a local commerce opportunity presented via client local commerce application module 116.

Local commerce server 120 operates to gather location information and interest information from a client device 110. As discussed above, an initial registration may be used to affiliate one or more client devices such as client device 110 with a client and local commerce server 120. Following the registration, a client device location module 112 of client device 110 may periodically communicate a location of client device 110 to local commerce server 120. This information is received at local commerce server 120 by client location module 122. Client location module 122 may receive location information from any number of client devices. Client location module 122 may associate this information with previously created accounts or identifiers. This information may then be passed to geofencing module 124. Geofencing module 124 may receive bounding information from merchant input module 132 as well as the client device location information from client location module 122. Geofencing module 124 may use these two sets of information to identify clients that are within an area of interest that is associated with the merchant of merchant device 130. The bounding information from merchant input module 132 may be a strictly defined area or may be weighted location preferences without a strictly defined boundary. For example, the bounding information may define a particular point or location with a weighted preference that decreases with distance from the identified point. In other embodiments, any other sort of location preference information may be provided as bounding information from merchant input module 132. Additionally, in certain embodiments, merchant input module 132 may provide multiple sets of bounding information to geofencing module 124, with each set of bounding information associated with a particular product or offer. For example, this first set of bounding information may be associated with an offer to deliver food to a particular location within 10 minutes. A second set of bounding information may be associated with an offer to deliver food to multiple locations within the bounding area within 30 minutes. Thus, geofencing module 124 may receive not only bounding information associated with a geo-fenced area, but may also receive a product identifier or product information that is associated with the bounding information.

Interest module 126 receives information about client preferences from client device profile module 114. This information may initially be received upon the registration process where client device 110 is registered with local commerce server 120. This information may also be received by a communication that occurs at any time from client device profile module 114 sending interest information associated with a client to interest module 126. Examples of interest information that may be sent from a client device profile module 114 to interest module 126 include food preferences, art preferences, musical preferences, or any preference that may be associated with a product or service that may be provided by a merchant associated with merchant device 130. Interest module 126 may take information about clients within an area of interest determined by geofencing module 124 and combine that with interest information from client device profile module 114 to generate an interest level for a first product.

Threshold module 128 may then receive additional threshold information from merchant input module 132, as well as geofencing information from geofencing module 124 and interest information from interest module 126. The additional threshold information from merchant input module 132 may identify an interest level at which the merchant wishes to provide or initiate an offer to the client device 110. This interest level may be defined by a particular number of client devices within the geo-fenced area that have expressed interest in the product identified by merchant device 130. This interest level may also be a weighted value that is generated by any type of client interest information, geofencing information, and weighting factors provided by merchant device 130. For example, if interest information is received from multiple clients, certain clients may receive greater weight due to history information associated with previous purchases, profile information about particular clients and client devices indicating a greater likelihood of a positive response to a merchant offer, or any other such information that may make an offer more attractive or more feasible for a merchant.

As local commerce server 120 operates, new location information, interest information, and merchant inputs are received over time. Interest levels associated with particular geo-fenced areas and products are compared with merchant provided thresholds as new information is received. If the threshold is not met, the system simply continues gathering information and repeating the process of determining an interest value and comparing that interest value with the threshold information or levels provided by a merchant for a particular product. This process may occur simultaneously for many different products from a single merchant, with each having associated boundary information provided by the merchant and interest thresholds provided by the merchant. Similarly, products from multiple different merchants may be handled by local commerce server 120 at the same time. If the interest threshold for a product is met by the interest value calculated for that product, local commerce server 120 will use local commerce communication module 129 to initiate a local commerce message. Such a local commerce message may be a message to merchant device 130 indicating that the threshold for a particular product was met. Such a local commerce message may also request authorization to take a local commerce action such as communicating an offer from local commerce server 120 to client device 110. In certain embodiments local commerce server 120 may have prior authorization based on a communication from merchant device 130 to automatically notify client device 110 that a local auction will take place at a particular time in response to the threshold being met. Local commerce server 120 may also automatically make an offer or a contingent offer for the product in a communication to client device 110 in response to a prior authorization from merchant device 130.

Figure 2:
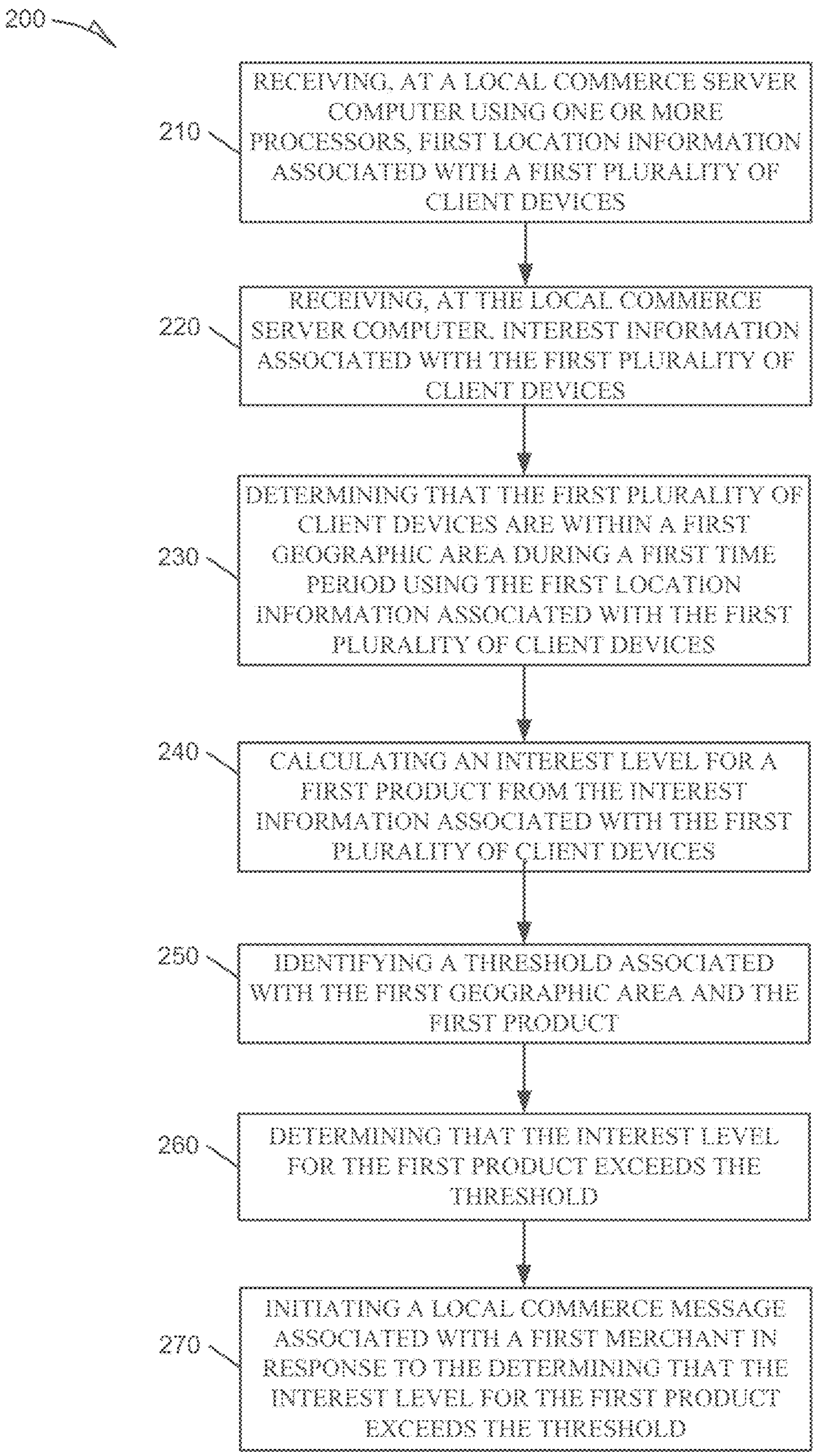
FIG. 2 illustrates a flow diagram on demand local commerce, in accordance with one example embodiment.

FIG. 2 illustrates a method for on demand local commerce, in accordance with one example embodiment. The example embodiment of FIG. 2 may be implemented with any local commerce server or system capable of performing the operations described below. For illustrative purposes however, the example embodiment of method 200 is described in the context of system 100.

Method 200 begins with operation 210 by receiving, at local commerce server 120, location information associated with a first plurality of client devices that includes client device 110. In operation 220, the local commerce server 120 receives interest information associated with the first plurality of client devices. This includes receipt of interest information from a client device 110. In operation 230, it is determined that the first plurality of client devices are within a first geographic area during the first time period. This determination is done using the first location information associated with the first plurality of client devices.

Method 200 continues in operation 240 by calculating an interest level for a first product from the interest information associated with the first plurality of client devices including client device 110. Operation 250 then involves identifying a threshold associated with the first geographic area and the first product. As described above, the threshold may be based both on bounding information and interest threshold values received from the merchant device 130. In certain embodiments, this threshold information may include both bounding information from the merchant device 130 that is used to determine or identify the first geographic area and client interest levels identified by merchant device 130. All of this information may be received from merchant device 130 along with information identifying the first product and associating the first product with the threshold and the first geographic area.

The method 200 then proceeds in operation 260 by determining that the interest level for the first product exceeds the threshold. This may be a simple comparison of values. This may also be a complex operation that compares multiple geographic areas with different weighted interest values identified by a merchant in order to determine if an acceptable level of interest is present based on the first location information and the interest information associated with the first plurality of client devices. Operation 270 then involves initiating a local commerce message associated with a first merchant in response to the determination that the interest level for the first product exceeds the threshold.

Though arranged serially in the example of FIG. 2, other examples may reorder the operations, omit one or more operations, and/or execute two or more operations in parallel using multiple processors or a single processor organized as two or more virtual machines or sub-processors. Moreover, still other examples can implement the operations as one or more specific interconnected hardware or integrated circuit modules with related control and data signals communicated between and through the modules. Thus, any process flow is applicable to software, firmware, hardware, and hybrid implementations.

Figure 3:
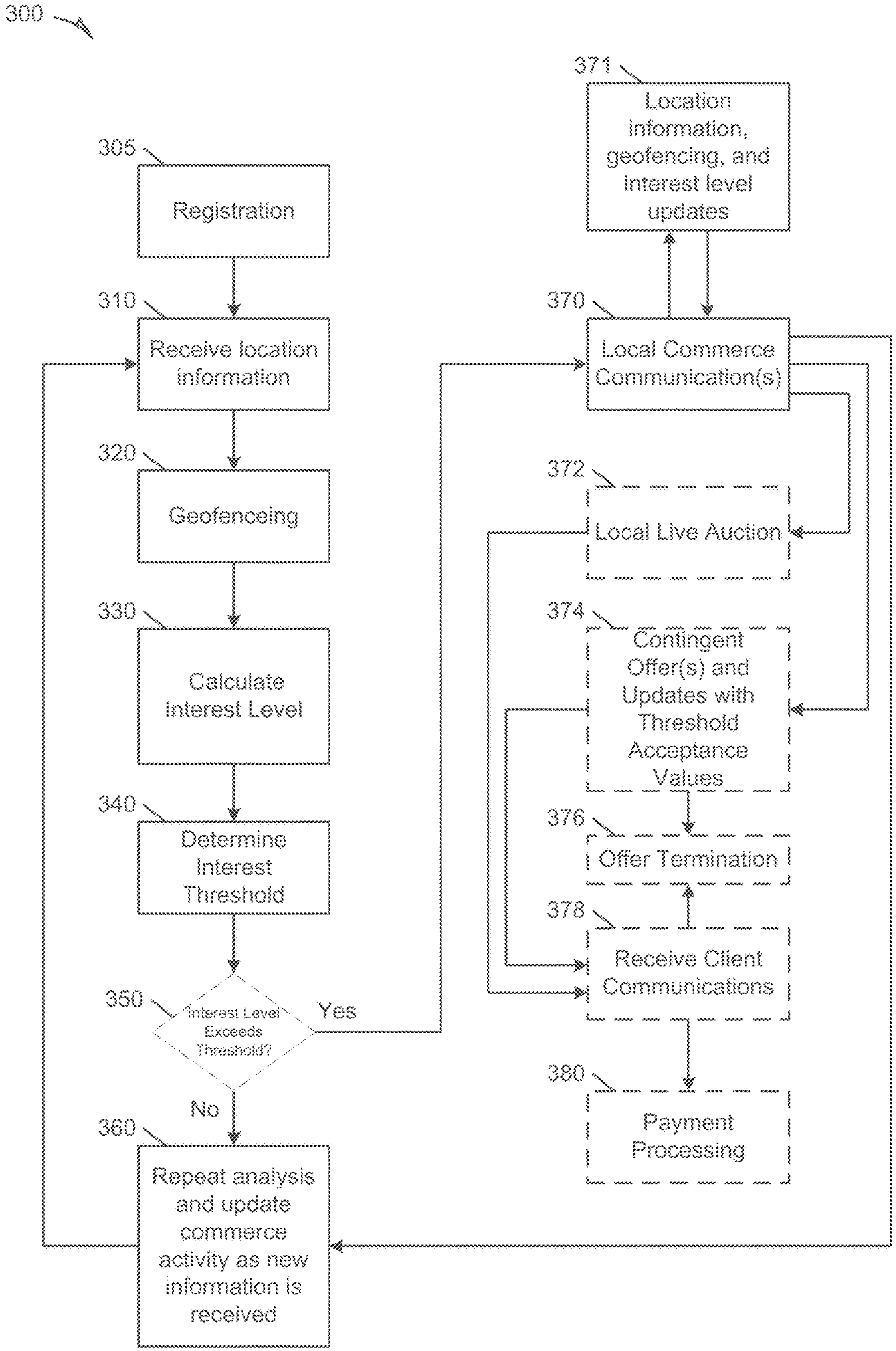
FIG. 3 illustrates a method for on demand local commerce, according to another example embodiment.

FIG. 3 illustrates a method 300 for on demand local commerce, according to another example embodiment. The method 300 begins with merchant and client registrations in operation 305. Any relevant information may be gathered during the registration, including association of clients and merchants with one or more devices, client interests, client preferences for contact details related to local commerce, initial merchant entry of product details and associated thresholds, and any other such initial information. For example, a client may choose to receive email messages, short message service (SMS) messages, computerized voice messages, application alert messages, or any other such messages from a local commerce server such as local commerce server 120. A client may similarly choose to receive particular types of these messages at certain times and not at other times. Similar types of client options may be selected for a merchant and the merchants associated devices. For example, a merchant may choose to receive messages on all of the merchant's associated devices during certain times and may choose to receive messages on only one of the plurality of the merchant's devices at other times. A merchant may elect to receive messages at certain times and to have automated local commerce actions taken without the merchant being contacted at other times.

During registration, a merchant may provide information for one or more local commerce products. This information may include sales options, such as a local offline auction option, a contingent multiple product offer, response deadlines, and whether a local commerce server may automatically present an offer to clients or whether confirmation must be received from a merchant device before an offer is presented to clients.

After the initial registration, a system receives location information from registered client devices in operation 310. How often this information is received may be a client selected option that may be set during registration and that may be modified as additional communications are received from a client device. A client may elect to have location information sent periodically, when a client device is within a certain geographic area, or only when a particular option is selected via a client interface of a client device location module or client local commerce application module operating on a client device.

Operation 320 then involves geofencing using the received location information and any bounding information received from a merchant device. The bounding information may be received either as part of the merchant registration or as part of a subsequent update from the merchant related to local commerce operations for a particular product or set of products. In various embodiments, a single geofencing operation may be associated with multiple merchant local commerce products and offers, or a geofencing operation may be associated with a single merchant local commerce product and offer. The geofencing of operation 320 may use strict boundaries provided by a merchant, or may involve a boundary that is generated using merchant criteria and the location information from client devices received in operation 310. Additional information related to geofencing processes are described below.

In operation 330, an interest level is calculated for a particular local commerce product. The interest level may be performed using only interest information for clients with an associated client device that has been within the geographic area identified by the geofencing operation within a predetermined time period. In other example embodiments, a per client interest level in the local commerce product may be identified for all system clients, and the geofencing information may be used to filter clients not relevant to a particular local commerce offer.

In operation 340, an interest threshold is determined. This may simply be a value provided by a merchant, or may be a calculated result of a formula with dynamic inputs such as the weather, the time of day, the time of year, recent merchant sales, client use of the system, or other such dynamic inputs.

In operation 350, the system determines if the calculated interest level meets or exceeds the interest threshold. Various embodiments may be set such that a calculated interest level may exceed or be equal to the threshold in order to trigger a local commerce action.

For example, a merchant may wish to offer an on demand auction of handmade furniture, including a handmade antique chair, at an outdoor market. The merchant may upload a picture and description of the chair to a local commerce server as part of a registration, and the merchant may select interest weighting values and an offer period of 10 AM to 2 PM on a particular day of the outdoor market. A registration process for a client or a local commerce application on a client's device may prompt a client to select an interest level for a number of categories, such as antique furniture, on a scale of one to ten. This information may be gathered and stored at a local commerce computer system. The local commerce system may additionally gather client profile information from any number of other sources. For example, the system may store a record of furniture purchases for a client. The local commerce system may generate a data driven interest value using sources, such as the purchase history, to generate a value that is also on a scale of one to ten. The client interest input and the data driven value may be added to create an individual client interest score, where (client interest input)+(data driven interest)=(individual client interest score). The individual client interest scores may then be weighted by proximity to the auction location. For example, a location information communication indicating that a device was at an auction location within the last 5 minutes may be weighted at 100% and may then linearly scale down so that a location 2000 feet away will be scaled to zero. Thus, a client device 1000 feet away will have the client's interest score cut in half, and client devices more than 2000 feet away will be outside the geofencing boundary. Thus:

(1) if geofence boundary distance to auction site > device distance to auction site, then: [(geofence boundary − device distance from auction site)/(boundary distance)]*[(client interest input) + (data driven interest)]=(weighted individual client interest value)
and
if geofence boundary distance to auction site <device distance to auction site, then: weighted individual client interest value = 0.

The sum of all the weighted individual client interest values may be the interest level calculated by the system for the furniture auction. For example, a merchant may set an interest level threshold of 200, such that 11 client device measurements at the auction location, where all 11 clients each have at or near the maximum interest score of 20, will trigger an auction (i.e. 11 device measurements each with an interest score of 20 will provide an interest level of 220 which is above the threshold of 200.)

In other embodiments, other weighting factors may be used. For example, a multiplier may be used as the day gets later and the end of the market approaches, with a trigger for the merchant to indicate that the chair has been sold. Alternatively, the interest threshold may decrease over time, such that a lower interest level will be required later in the day. This would, for example, support an auction near the end of the day if there is interest in a product and a storefront or booth price is not met during the day.

If, in operation 350, the interest level does not exceed the threshold, then in operation 360 the process repeats and returns to operation 310. Operation 360 may involve record storage and creation of historical data that may be used as feedback for any dynamic aspects of geofencing or interest level calculation. As the process repeats, any dynamic values such as time or device location may be updated, and the process may repeat. In certain embodiments, a local commerce product may be canceled. For example, in the auction product described above, if a chair sells at a storefront of the open market, the merchant may send a message to the local commerce server that the on demand auction for the chair is no longer available, and the local commerce server will cease checking the interest level and the threshold for the chair.

If, in operation 350, the interest level does exceed the threshold, then the process proceeds with operation 370, and the initiation of a local commerce communication. The particular local commerce communication that is initiated will depend on merchant selections for a particular local commerce product. If a merchant has enabled or authorized a local commerce server to automatically create an offer, then the local commerce communication that is part of operation 370 may be sent directly to a plurality of client devices. This communication may be sent only to client devices that have been within the geo-fenced area as determined by operation 320, to any device that has been within or near the geofencing area within the predetermined time, or sent to all client devices that have elected to receive such communications. Systems that send such local commerce communications to all authorized client devices may be used to incentivize clients that are outside of the geofencing area to participate even though the interest of those clients was not used in calculation of the interest level.

In certain local commerce offerings, a merchant may receive the local commerce communication of operation 370 and may send a confirmation message to the local commerce server verifying that a local commerce operation will proceed. If the local commerce operation is either confirmed by the merchant or performed automatically, the system will proceed with the operation as defined by the merchant. This may include a local live auction as illustrated by operation 372. This may alternatively include a contingent offer as illustrated by operation 374. Any other type of offer or combination of such offers allowable by the system and selected by a merchant can result from the determination that the interest level exceeds the threshold.

As part of any local commerce operations that may be initiated by a determination that an interest value has exceeded a threshold value, a system may continue to gather and update location information, geofencing, and interest information in operation 371, and use this information to initiate further local commerce communications in operation 370. For example, if additional client devices enter a geofenced area after a local commerce auction has been initiated, but before conclusion of the auction, the client devices may be sent local commerce communications informing the client devices of the local auctions.

In one embodiment, if a sufficient number of client devices leave a geofenced area after the local commerce action has been initiated, then as part of operation 371, the local commerce action may be delayed, canceled, or moved, with an associated communication sent following this change in operation 370. In certain embodiments, a system may include multiple thresholds. For example, a first threshold may result in an initial local commerce communication indicating that a basic interest threshold has been met, and a local commerce event will be initiated if a second interest threshold greater than the basic interest threshold is met, then a local commerce action will be initiated. Such an initial local commerce action may be a communication requesting feedback. The feedback may then be used in updating the interest value. If the second interest level is not met, then the local commerce action will not be initiated. If the second interest level is met, but then the interest value drops below the basic interest threshold, then the event may be canceled or moved. In certain embodiments, a cancelation warning may be sent when the interest value drops below the second threshold, and the cancelation message sent after the interest value drops below the basic threshold.

Additionally, as described above, geofencing operations may continue as part of operation 371. If, after an initial local commerce communication in operation 370, a shift is seen in the geographic area associated with the interest as part of operation 371, this may initiate a subsequent local commerce communication operation 370 that communicates a shift in the geographic area associated with the local commerce event or action. Such processes as part of operation 371 may involve multiple repeated processes of any combination of operations that are part of method 300. In certain embodiments, these repetitions of geofencing, location information reception, and threshold calculation may occur continuously, periodically, or in response to a system trigger. In certain embodiments, certain repeated operations may occur periodically, and others may be triggered as part of the same overall system. During repetition of these operations as part of operation 371, any local commerce operations may continue as data analysis and geofencing determinations continue as part of operation 371.

If optional operation 372 is part of the local commerce offer with a local live auction, a local commerce communication to client devices may provide product details such as a product picture, an auction start price, a price raise increment, auction format information including bid timings, or any other such auction details. As part of such an auction, when the auction starts, the local commerce server may receive client communications including auction bids as part of operation 378. When the auction closes, client devices may be sent offer termination communications in operation 376. If a successful bid is received during operation 373, the local commerce server may proceed to payment processing in operation 380. Such a payment processing operation may be automatically performed using payment details that were previously provided by a client during the registration process, may involve a request and response with a client for payment information before the process closes, or may involve any other such payment process. In certain embodiments, the payment process of operation 380 may be performed by the local commerce server. In other embodiments, a separate payment processing device may be used to perform operation 380. In certain embodiments, if a successful bid is received but payment is not successfully authorized within a certain time, the process may repeat at operation 310 (not illustrated in the flow.)

If, alternatively, the local commerce action is not an auction but is instead a contingent offer, then the method 300 will proceed with operation 374. An example of such a contingent offer may be an offer to deliver furniture to a particular area if a sufficient number of furniture articles are purchased or if a sufficient dollar value of furniture articles are purchased as part of the offer within a particular time period. If the contingency is not met, then an offer termination communication may be sent to relevant client devices that received the offer as part of operation 376. Offers may be received from client devices as part of client communications in operation 378. Just as with the auction processes, if sufficient offers are received and the local commerce action is successful, payment processing may be performed in operation 380 prior to final confirmation that the contingent offer has been accepted. For example, if a contingent offer requires a sale of $5000 worth of furniture for sale and delivery to a particular location and $6000 worth of furniture is accepted in client communications as part of operation 378, but payment is only successfully processed for $4000 worth of the furniture in operation 380, then the contingent offer will fail, and the process may repeat at operation 310. If the contingent offer is met including successful payment processing or completion of any other merchant requirements, then the process completes and communications may be sent to purchasing client devices and merchants with verifying details associated with the sale of the local commerce product.

Figure 4:
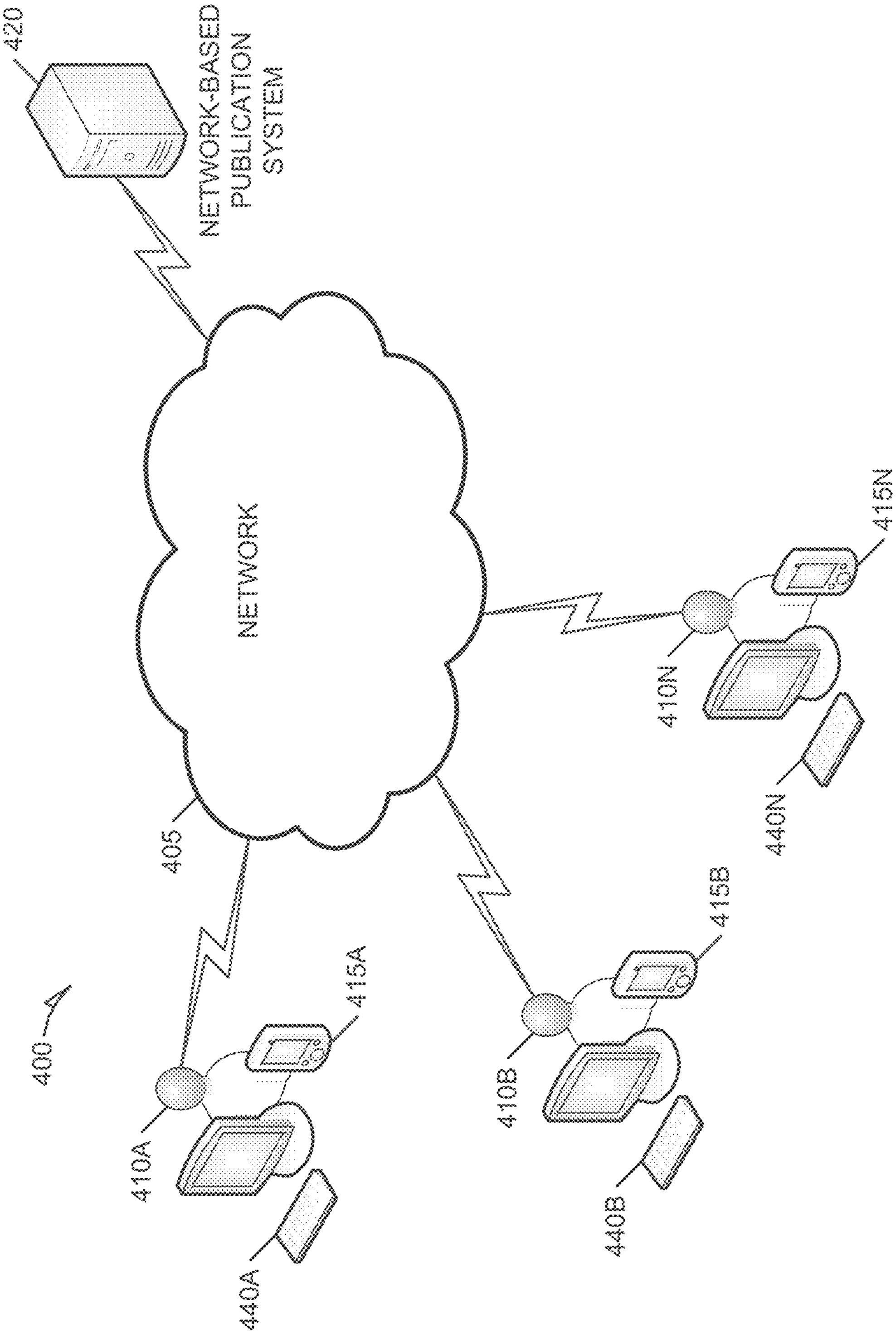
FIG. 4 illustrates a system that may be used to enable on demand local commerce in certain example embodiments.

FIG. 4 illustrates a system that may be used to enable on demand local commerce in certain example embodiments. In an example, system 400 can include client devices 410A-410N (collectively referred to as either client device 410 or client devices 410 depending upon context) and a local commerce system 420. In certain embodiments, client devices 410A-410N may function similarly to client device 110 of system 100 discussed above, and local commerce system 420 may function in a manner similar to local commerce server 120. In various embodiments, local commerce server 420 may or may not integrate merchant device functionality similar to merchant device 130. In an example, the client devices 410A-410N can connect to the local commerce system 420 via mobile devices 415A-415N (collectively referred to as mobile device 415). Client devices 410A-410N can also connect to the local commerce system 420 via client devices 440A-440N (collectively referred to as client device 440 or client devices 440). In certain examples, client devices 410 can receive communications, on mobile devices 415 or client devices 440, from the local commerce system 420 transmitted over network 405, but the client devices 410 may not otherwise make any sort of direct connection with the local commerce system 420.

In an example, the client devices 410 can configure an account on the local commerce system 420. The account can be accessed by a client, such as client device 410A, using mobile device 415A or client device 440A, if client device 410A meets the specified access criteria or rules. In an example, the access rules can include client identification and/or mobile device identification. A client account on the local commerce system 420 can allow the client to define specific products of interest or provide other client data that can be used by the local commerce system 420. In some examples, the local commerce system 420 can monitor client behavior and create geofences based on past and predicted client behaviors in response to merchant criteria. This may enable merchants to provide abstractly defined geofencing parameters to identify threshold interest levels where clients, using client devices 410, opt-in to receive local commerce communications. Such abstractly defined geofencing parameters may include geofences created with interest levels based on client locations and interests, but with a search area for generation of the geofences that is much larger than the created geofence. For example, an entire state may be a search area covering millions of square miles, with geofences created when client devices are within an area that is on the order of a single city block or within a single store. For example, an electronics store may use on demand local commerce to offer promotional prices to client devices in a particular geographic area at a particular time. Such a local commerce system may use dynamic geofences to target a geographic area that is likely to include a segment of client devices 410 that meet express interest in a particular type of local commerce product.

Figure 5:
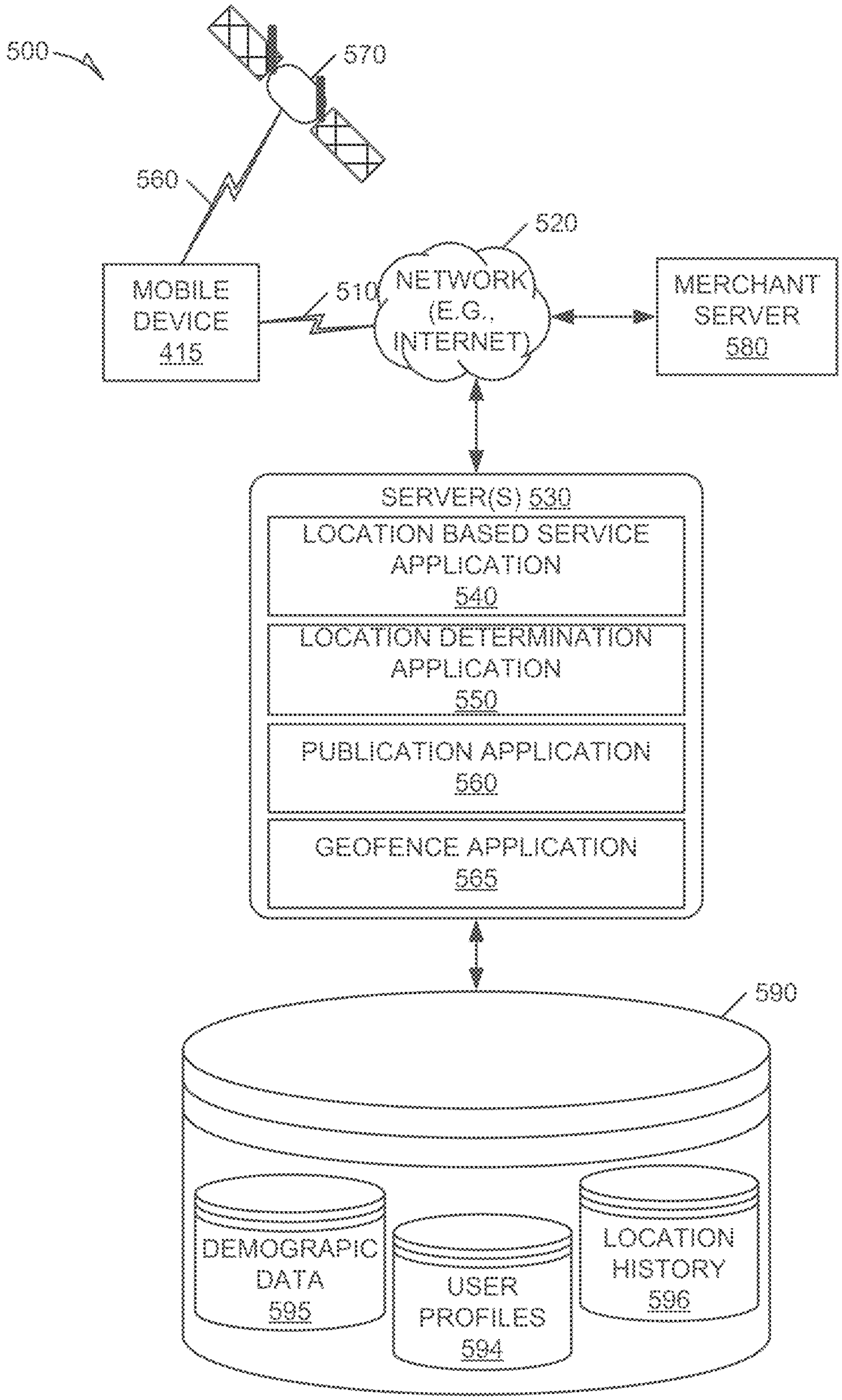
FIG. 5 illustrates aspects of a system that may be used for local commerce in certain example embodiments.

FIG. 5 is a block diagram illustrating an environment 500 for operating a mobile device 415, according to an example embodiment. As mentioned above, mobile device 415 may operate as a client device 110 in certain embodiments. The environment 500 is an example environment within which methods for using on demand local commerce can be implemented. The environment 500 can include a mobile device 415, a communication connection 510, a network 520, local commerce servers 530, a communication satellite 570, a merchant server 580, and a database 590. Merchant server 580 may, in certain embodiments, be similar to merchant device 130 of system 100. The local commerce servers 530 can optionally include location based service (LBS) application 540, location determination application 550, communication application 560, and geofence application 565. The database 590 can optionally include demographic data 595, user profiles 594, and/or location history 596. The mobile device 415 represents one example device that can be utilized by a client to receive local commerce communications.

The mobile device 415 may be any of a variety of types of devices (for example, a cellular telephone, a personal digital assistant (PDA), a Personal Navigation Device (PND), a handheld computer, a tablet computer, a notebook computer, or other type of movable device). The mobile device 415 may interface via a connection 510 with a communication network 520. Depending on the form of the mobile device 415, any of a variety of types of connections 510 and communication networks 520 may be used.

For example, the connection 510 may be Code Division Multiple Access (CDMA) connection, a Global System for Mobile communications (GSM) connection, or other type of cellular connection. Such connection 510 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 7G networks). When such technology is employed, the communication network 520 may include a cellular network that has a plurality of cell sites of overlapping geographic coverage, interconnected by cellular telephone exchanges. These cellular telephone exchanges may be coupled to a network backbone (for example, the public switched telephone network (PSTN), a packet-switched data network, or other types of networks).

In another example, the connection 510 may be a Wi-Fi or IEEE 802.11x type connection, a Worldwide Interoperability for Microwave Access (WiMAX) connection, or another type of wireless data connection. In such an embodiment, the communication network 520 may include one or more wireless access points coupled to a local area network (LAN), a wide area network (WAN), the Internet, or other packet-switched data network.

In yet another example, the connection 510 may be a wired connection, for example an Ethernet link, and the communication network may be a LAN, a WAN, the Internet, or other packet-switched data network. Accordingly, a variety of different configurations are expressly contemplated.

The above communication technologies may be used both for local commerce communications and also to assist in location determination of mobile device 415 in order to generate location information with network assisted location based services. This location information may additionally use sensor information and satellite signals in the generation of location information, and the location information may then be communicated from mobile device 415 to local commerce servers 530.

A plurality of local commerce servers 530 may be coupled via interfaces to the communication network 520, for example, via wired or wireless interfaces. These local commerce servers 530 may be configured to provide various types of services to the mobile device 415. For example, one or more local commerce servers 530 may execute LBS applications 540, which interoperate with software executing on the mobile device 415, to provide LBSs to a client. LBSs can use knowledge of the device's location, and/or the location of other devices, to provide location-specific information, recommendations, notifications, interactive capabilities, and/or other functionality to a client. For example, an LBS application 540 can provide location data to a local commerce server 120, which can then be used to provide location-aware communications from the local commerce server 120, where local commerce servers 530 can be operating with the local commerce server 120. Knowledge of the device's location, and/or the location of other devices, may be obtained through interoperation of the mobile device 415 with a location determination application 550 executing on one or more of the local commerce servers 530. Location information may also be provided by the mobile device 415, without use of a location determination application, such as application 550. In certain examples, the mobile device 415 may have some limited location determination capabilities that are augmented by the location determination application 550. In some examples, the local commerce servers 530 can also include communication application 560 for providing local commerce communications with client devices and merchant devices. These communications may include notifications of offers, bid communications for on demand local auctions, payment communications, system setting communications, or any other such communications. In certain examples, location data can be used by the communication application 560 along with geofencing information and additional location information provided by the location determination application 550. In some examples, the location data provided by the location determination application 550 can include merchant information (e.g., identification of a retail location) that is associated with on demand local auctions or other local commerce actions or offers. In certain examples, the location determination application 550 can receive signals via the network 520 to further identify a location. For example, a merchant may broadcast a specific IEEE 802.11 service set identifier (SSID) that can be interpreted by the location determination application 550 to identify a particular retail location. In another example, the merchant may broadcast an identification signal via radio-frequency identification (RFID), near-field communication (NFC), or a similar protocol that can be used by the location determination application 550. In addition to examples using these various mechanisms to identify a particular location, these mechanisms (e.g., SSIDs, RFIDs, NFC, and so forth) can be used as secondary authentication factors, which are discussed in more detail below.

In certain examples, the geofence application 565 can leverage the LBS application 540 or the location determination application 550 to assist in generating and/or updating geofences based on guidelines provided by a merchant and associated with a particular local commerce event. Additional information such as current or historical user data and statistics may also be used by the geofencing application 565 to assist in generating or updating geofences. For example, a merchant may provide product information and geofencing guideline information to a local commerce server. The local commerce server may use this information along with historical location data seen by the system to generate a geofence. This geofence may then be used with location data received from client devices to calculate interest levels and compare the interest levels with a threshold determined using the merchant guidelines.

Figure 6:
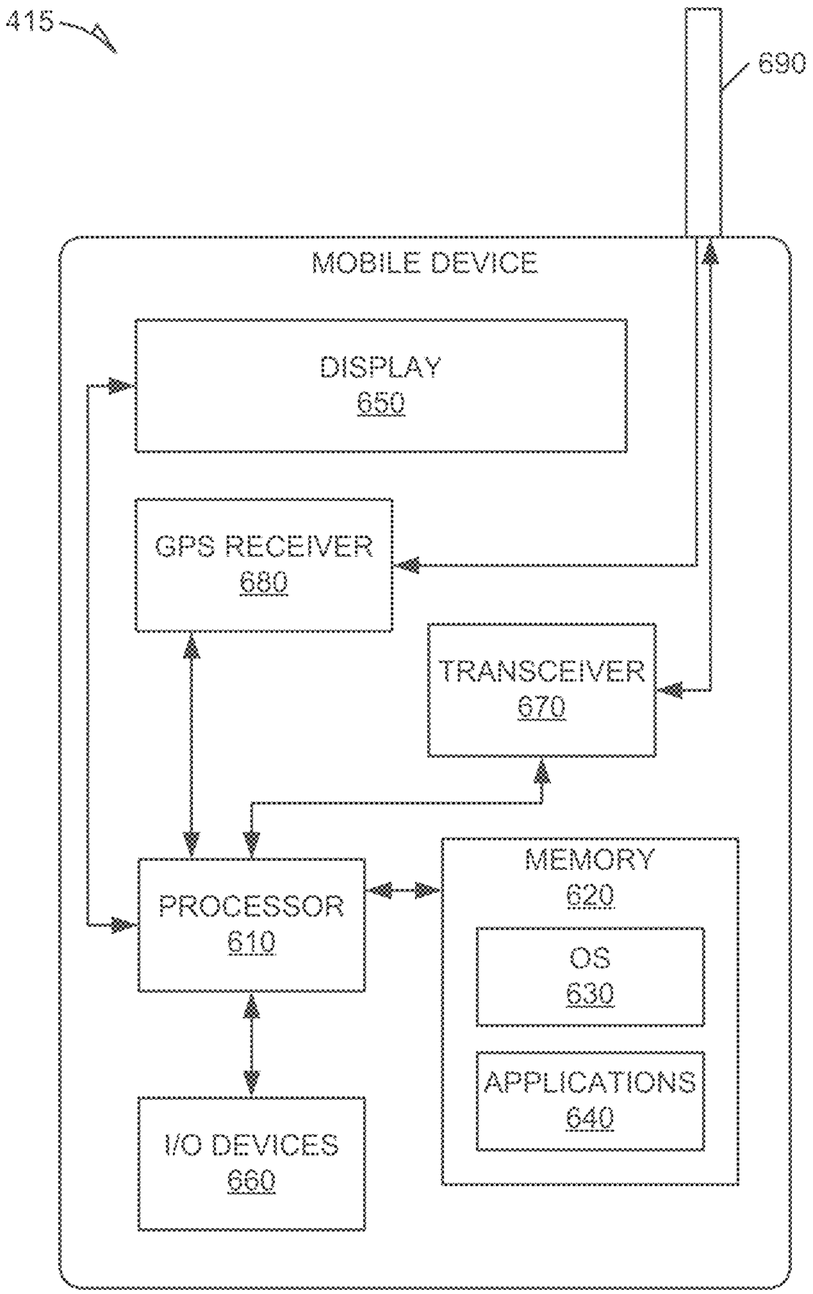
FIG. 6 illustrates a mobile device that may be used with certain example embodiments of local commerce described herein.

FIG. 6 is a block diagram illustrating the mobile device 415, according to an example embodiment. The mobile device 415 may include a processor 610. The processor 610 may be any of a variety of different types of commercially available processors suitable for mobile devices (for example, an XScale architecture microprocessor, a Microprocessor without Interlocked Pipeline Stages (MIPS) architecture processor, or another type of processor). A memory 620, such as a Random Access Memory (RAM), a Flash memory, or other type of memory, is typically accessible to the processor. The memory 620 may be adapted to store an operating system (OS) 630, as well as application programs 640, such as a mobile location enabled application that may provide LBSs to a client. The processor 610 may be coupled, either directly or via appropriate intermediary hardware, to a display 650 and to one or more input/output (I/O) devices 660, such as a keypad, a touch panel sensor, a microphone, and the like. Similarly, in some embodiments, the processor 610 may be coupled to a transceiver 670 that interfaces with an antenna 690. The transceiver 670 may be configured to both transmit and receive cellular network signals, wireless data signals, or other types of signals via the antenna 690, depending on the nature of the mobile device 415. In this manner, the connection 510 with the communication network 520 may be established. Further, in some configurations, a GPS receiver 680 may also make use of the antenna 690 to receive GPS signals.

Figure 7:
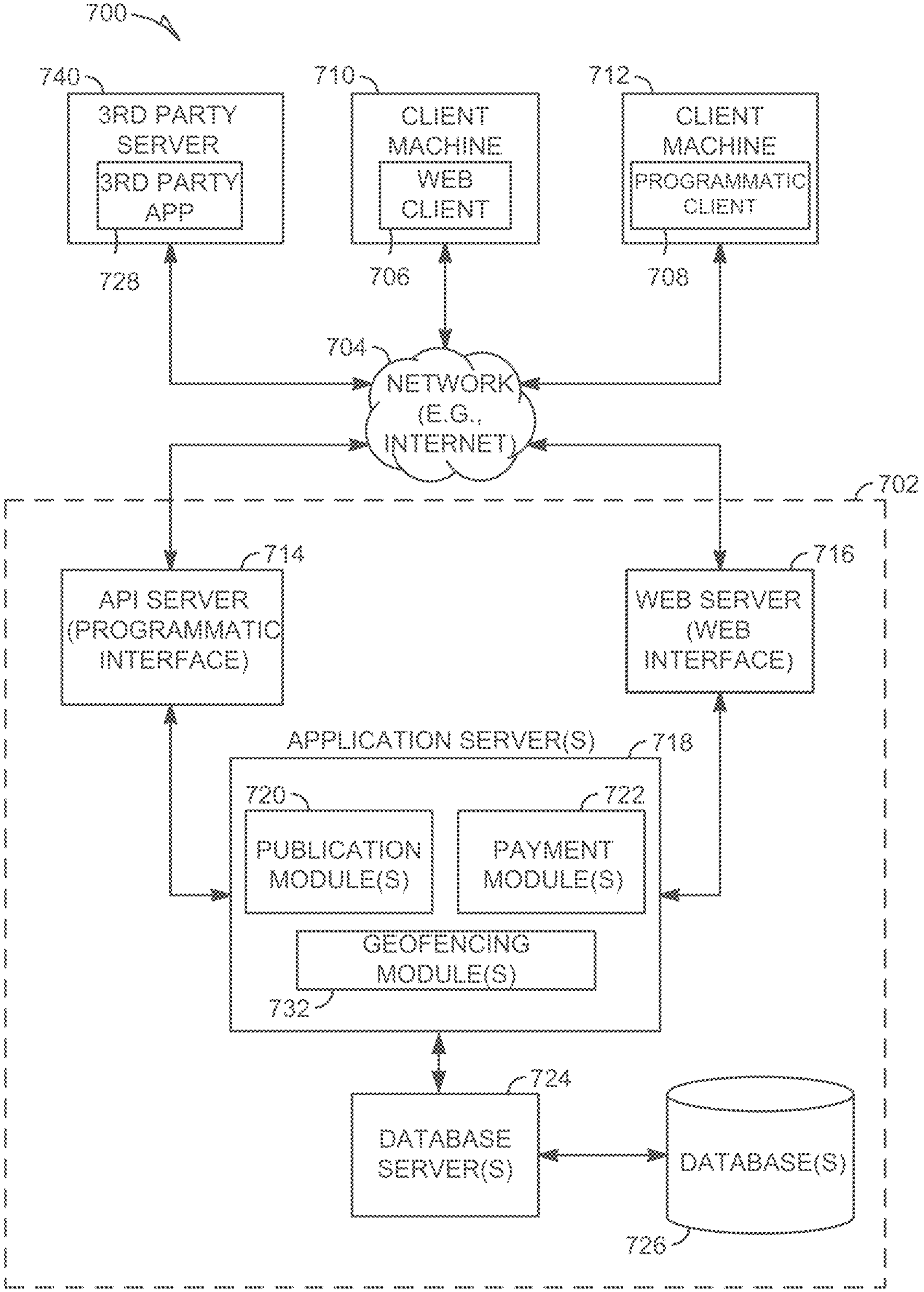
FIG. 7 is a block diagram illustrating a network-based system for local commerce, according to an example embodiment.

FIG. 7 is a block diagram illustrating a network-based system 700 for using on demand local commerce, according to an example embodiment. The block diagram depicts a network-based system 700 (in the exemplary form of a client-server system), within which an example embodiment can be deployed. A networked system 702 is shown, in the example form of a network-based local commerce system, that provides server-side functionality, via a network 704 (e.g., the Internet or WAN) to one or more client machines 710, 712. FIG. 7 illustrates, for example, a web client 706 (e.g., a browser, such as the Internet Explorer browser developed by Microsoft Corporation of Redmond, Washington State) and a programmatic client 708 (e.g., an eBay smart phone application from eBay, Inc. of San Jose California) executing on respective client machines 710 and 712. In an example, the client machines 710 and 712 can be in the form of a mobile device, such as mobile device 415.

An Application Programming Interface (API) server 714 and a web server 716 are coupled to, and provide programmatic and web interfaces respectively to, one or more application servers 718. The application servers 718 host one or more communication modules 720 (in certain examples, these can also include commerce modules, advertising modules, and marketplace modules that may be used for on demand local commerce to name a few), payment modules 722, and geofencing modules 732. The application servers 718 are, in turn, shown to be coupled to one or more database servers 724 that facilitate access to one or more databases 726. In some examples, the application server 718 can access the databases 726 directly without the need for a database server 724.

The communication modules 720 may provide a number of communication functions and services to clients and merchants who access the networked system 702. The payment modules 722 may likewise provide a number of payment services and functions to clients and merchants. The payment modules 722 may allow clients to accumulate value (e.g., in a commercial currency, such as the U.S. dollar, or a proprietary currency, such as “points”) in accounts, and then later to redeem the accumulated value for products (e.g., goods or services) that are advertised or made available via on demand local commerce from merchants. The payment modules 722 can also be configured to facilitate payment processing based on geofence detection and work in conjunction with the geofencing modules 732 as described above in the example embodiment of method 300. The geofencing modules 732 may provide generation and updating of on demand local commerce, among other things. While the communication modules 720, payment modules 722, and geofencing modules 732 are shown in FIG. 7 to all form part of the networked system 702, it will be appreciated that, in alternative embodiments, the payment modules 722 may form part of a payment service that is separate and distinct from the networked system 702.

Further, while the system 700 shown in FIG. 7 employs client-server architecture, the present invention is of course not limited to such an architecture, and could equally well find application in other structures such as a distributed, or peer-to-peer, architecture system, for example.

The web client 706 accesses the various communication modules 720, payment modules 722, and geofencing modules 732 via the web interface supported by the web server 716. Similarly, the programmatic client 708 accesses the various services and functions provided by the communication modules 720, payment modules 722, and geofencing modules 732 via the programmatic interface provided by the API server 714. The programmatic client 708 may, for example, be a smart phone application that enables clients to pass location information to a local commerce server, provide interest information to a local commerce server, and send and receive bid and offer communications as part of on demand local commerce. In certain embodiments, a programmatic client 708 may be used to submit bids in an on demand local commerce auction environment where an auctioneer and a physical product are at the same location as the client machine 712. A verbal auction offer may be made during the on demand local auction, and a user may respond by submitting an increased bid using the programmatic client 708 operating on the client machine 712. This may involve a text input via a keyboard or touchscreen interface. This may also involve movement of client machine 712, such as raising client machine 712 like an auction paddle. In certain embodiments, the programmatic client may receive a networked communication about a current auction level, and an accelerometer or motion sensor within client machine 712 may detected a raising motion that is accepted as an input to submit an offer increasing the bid by a minimum bid amount. This input may be communicated to a local commerce server and relayed to a merchant device. The merchant device will then communicate the updated bid level to other client devices involved in the auction.

FIG. 7 also illustrates a third party application 728, executing on a third party server machine 740, as having programmatic access to the networked system 702 via the programmatic interface provided by the API server 714. For example, the third party application 728 may, utilizing information retrieved from the networked system 702, support one or more features or functions on a website hosted by the third party. The third party website may, for example, provide one or more promotional, marketplace, or payment functions that are supported by the relevant applications of the networked system 702. Additionally, the third party website may provide merchants with access to the geofencing modules 732 for on demand local commerce processes.

Figure 8:
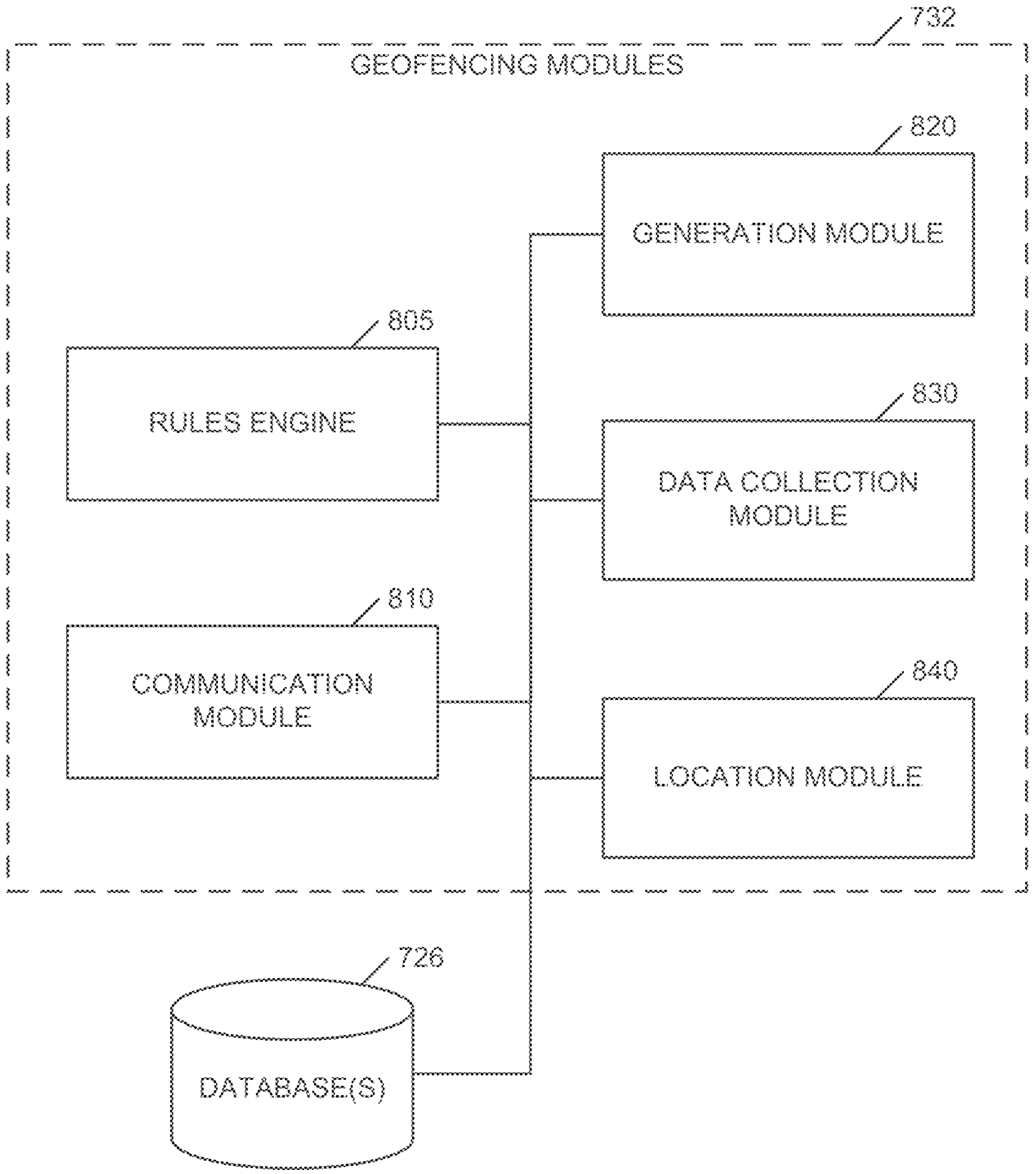
FIG. 8 is a block diagram illustrating geofencing modules that may be used with local commerce systems, according to an example embodiment.

FIG. 8 is a block diagram illustrating geofencing modules 732, according to an example embodiment. In this example, the geofencing modules 732 can include a rules engine 805, a communication module 810, a generation module 820, a data collection module 830, and a location module 840. In an example, the geofencing modules 732 can access database 726 to store and/or retrieve generation rules, client profile data, location data, and demographic data, as well as other information, to enable dynamic geofencing.

In an example, the rules engine 805 can be configured to manage and evaluate rules controlling geofence generation and updating. Rules can be provided by a merchant on a per product basis, per event basis, per product category basis, or on any other such basis. One of the "rules" can define the type of statistical analysis as well as the target demographic or subset of system clients to be used in generating or updating a geofence. For example, a geofence rule may correlate the geofence radius to population density of the target geographical area. In some example local commerce actions, a merchant may want to avoid having too many or too few attendees at a local commerce auction in order to provide an ideal client environment. In this example, the lower the population density, the larger the radius of the resulting geofence. Accordingly, for a franchisee with locations in different geographic areas, such a rule can allow for locations in low density areas and locations in high density areas to still attempt to provide a standardized local commerce experience.

In an example, the communication module 810 can be configured to manage communications between the geofencing modules 732 and a client, where the client is communicating via the mobile device 415 or the client device 110. The communication module 810 can also be configured to manage communications between the geofencing modules 732 and a merchant. For example, the geofencing module may determine which client devices out of all client devices in a system will receive certain on demand local commerce communications based on the location information for a device as associated with a geofence generated by geofencing modules 732.

In an example, the generation module 820 is configured to generate and update geofences according to information provided by modules, such as the data collection module 830, the location module 840, and the rules engine 805.

Figure 9:
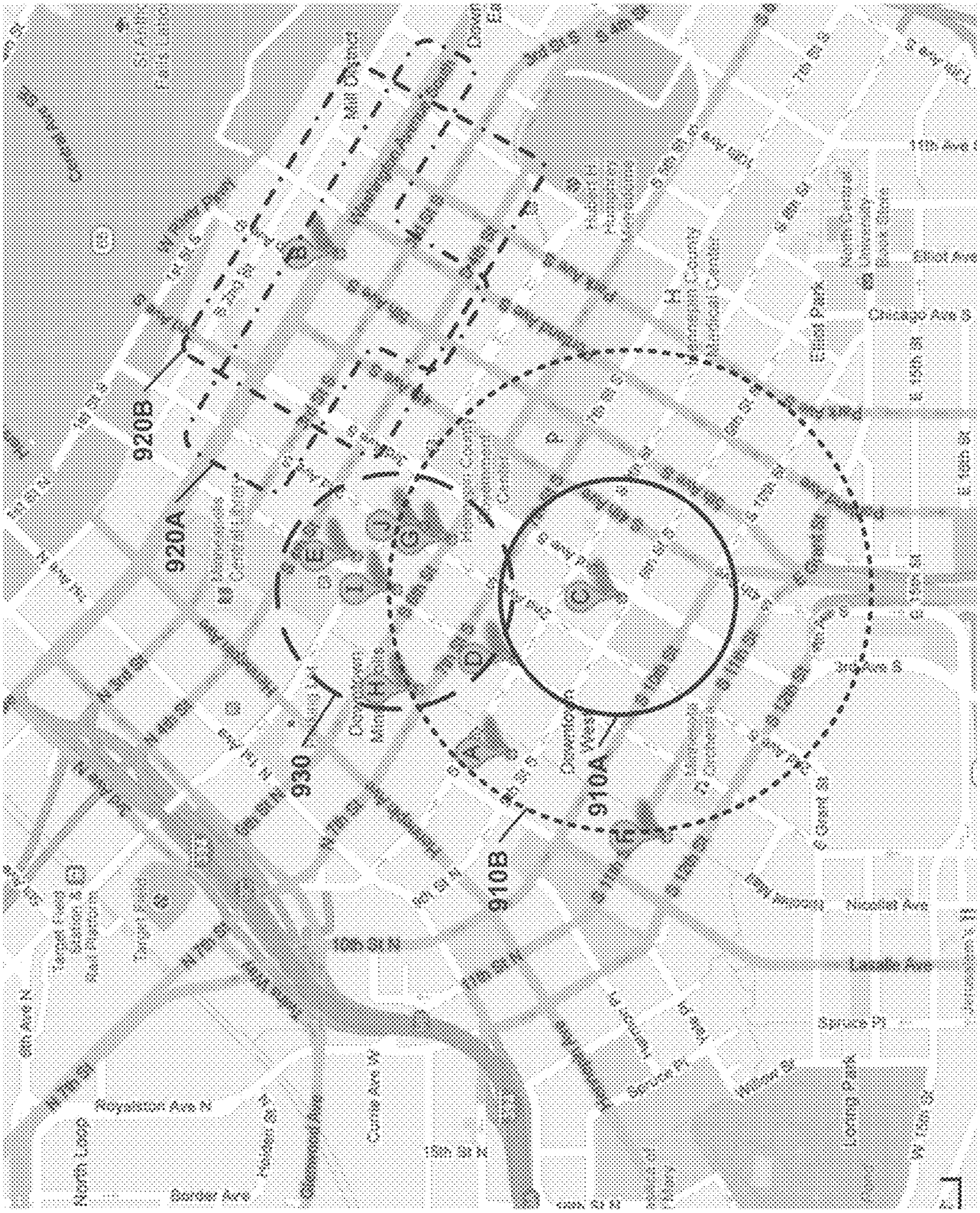
FIG. 9 is a diagram illustrating aspects of local commerce, according to one example embodiment.

In an example, the location module 840 is configured to receive location data from a mobile device, such as mobile device 415, and determine from the location data a current physical location, which may include reference to landmarks or other sites of interest. In some examples, the location module 840 can receive GPS-type coordinates (e.g., longitude and latitude), which can be used to establish a current location associated with a mobile device (and, thus, a client of the mobile device). Using the longitude and latitude coordinates, the location module 840 can determine if the current location is within a geofence, for example. In another example, some merchants may broadcast specific wireless network signals that can be received by a mobile device, such as mobile device 415. Once received, the mobile device 415 can include programming or circuitry to translate the signal into a specific location, or the mobile device 415 can simply retransmit the unique signal to the location module 840. In an example, a merchant location can transmit a unique SSID, which the location module 840 can be programmed to interpret as identifying a specific merchant location. In another example, the merchant may broadcast a unique SSID within all of its locations and the location module 840 can be programmed to use a combination of the unique SSID and other location data (e.g., GPS coordinates or cell tower locations) to identify a specific location FIG. 9 is a diagram illustrating geofence updating via statistical analysis, according to an example embodiment. The map display 900 includes a number of geofences (910, 920, and 930) and highlighted locations (A-J). In this example, three geofences are illustrated including two dynamic geofences 910 (910A, 910B) and 920 (620A, 920B) and one static geofence 930. All of the illustrated geofences can be used to determine an interest level associated with a product, and to target communications to client devices within a limited geographic area if the interest level associated with the product in the geofenced area exceeds a threshold. Further, even geofence 930, which is illustrated as a static or unchanging, can be updated to change its size or shape at some future point in time.

In an example, geofence 910A can represent an initial state of geofence 910 generated around location C. Location C may be, for example, a potential site of an on demand local commerce auction for a merchant's product. Geofence 910 represents a simple circular geofence centered on location C. In this example, geofence 910 can include a geofence parameter defining the radius of the dynamic geofence. In an example, the geofence parameter for geofence 910 can be based on a merchant selection, traffic information that may influence the ability of clients to travel to location C, target demographic information, or other such information. In this example, the geofence 910 can shift between a first geofence parameter value resulting in geofence 910A and a second geofence parameter value resulting in geofence 910B due to shifts in the time of day, travel conditions, weather, merchant direct input settings, or any other such geofence parameter.

In another example, geofence 920 represents a more complex geofence laid out to cover a particular geographic area, which may correlate to certain traffic patterns, local retail locations, or client demographic data, among other things. Geofence 920 can be defined by a series of coordinates (latitude/longitude pairs), city block designations, or street intersections, among other things. Geofence 920 also illustrates the potential for a geofence to shift in shape due to changes in related demographics or other statistical data driving the particular shape. For example, an advertiser may want to avoid areas of a city that include competing locations, and such locations may change over time. In an example, a food truck operator may request that the local commerce server 120 run an on demand local commerce offer within the operating area for the food truck for a particular time frame. Geofence 920 can illustrate two different operating areas 920A and 920B, which may represent areas targeted on different days of the week or a shift in areas based on changes in competitor locations. While geofence areas 920A and 920B overlap, as illustrated in FIG. 9, there is no requirement for overlap between iterations of a dynamic geofence.

Thus, an additional example embodiment that conforms with the implementations described above comprises a method including receiving, at a local commerce server computer using one or more processors, first location information associated with a first plurality of client devices; receiving, at the local commerce server computer, interest information associated with the first plurality of client devices; determining that the first plurality of client devices are within a first geographic area during a first time period using the first location information associated with the first plurality of client devices; calculating an interest level for a first product from the interest information associated with the first plurality of client devices; identifying a threshold associated with the first geographic area and the first product; determining that the interest level for the first product exceeds the threshold; and initiating a local commerce message associated with a first merchant in response to the determining that the interest level for the first product exceeds the threshold.

Further implementations of such an example embodiment may operate where the local commerce message is an on demand live auction notification. Further implementations of such an example embodiment may operate by receiving a first auction input identifying the first geographic area from a first merchant computer associated with the first merchant; receiving a second auction input identifying the first product; and receiving a third auction input setting the threshold.

Further implementations of such an example embodiment may operate by communicating an auction notification message to the first plurality of client devices, wherein the auction notification message comprises product information associated with the first products and an auction start time.

Further implementations of such an example embodiment may operate where the auction notification message further comprises coordinates for an auction location that is within the first geographic area.

Further implementations of such an example embodiment may operate by receiving an auction bid communication from a first client device after the auction start time; communicating a first auction update to the first plurality of client devices in response to receipt of the auction bid communication; and communicating a seller auction update to an auction device associated with the first merchant.

Further implementations of such an example embodiment may operate where the local commerce message comprises a conditional sale offer associated with the first product. Further implementations of such an example embodiment may operate where the conditional sale offer comprises a delivery location within the geographic area, an acceptance time window, a delivery time window, and a threshold acceptance quantity.

Further implementations of such an example embodiment may operate by receiving a first acceptance communication from a first client device of the first plurality of client devices and communicating a threshold acceptance update to the first plurality of client devices.

Further implementations of such an example embodiment may operate by receiving a second acceptance communication from a second client device of the first plurality of client devices; determining that the threshold acceptance quantity has been met; automatically performing a first payment process associated with the first acceptance communication; automatically performing a second payment process associated with the second acceptance communication; determining that payment has been received for the threshold acceptance quantity of the first product; and automatically communicating a purchase confirmation message to the first device and the second device in response to the determining that payment has been received for the threshold acceptance quantity of the first product.

Further implementations of such an example embodiment may operate where the conditional sale offer further comprises a maximum acceptance value.

Further implementations of such an example embodiment may operate by receiving a first acceptance communication from a first client device; determining that the maximum acceptance value has been met; and communicating an offer termination message to the first plurality of client devices in response to the determination that the maximum acceptance value has been met.

Further implementations of such an example embodiment may operate by receiving second location information associated with a second plurality of client devices and at least a portion of the first plurality of client devices, wherein the first location information is received during the first time period, and wherein the second location information is received during a second time period that is later than the first time period; receiving, at the local commerce server computer, interest information associated with the second plurality of client devices; determining that the second plurality of client devices and the at least a portion of the first plurality of client devices are within the first geographic area during the second time period using the second location information; calculating a second interest level for the first product from the interest information associated with the second plurality of client devices and the interest information associated with the at least a portion of the first plurality of client devices; and initiating a local commerce update message based on the second interest level.

Further implementations of such an example embodiment may operate where the local commerce message comprises an offline market recommendation, and wherein the offline market recommendation comprises a recommended quantity associated with the first product; and wherein the local commerce update message comprises an updated recommendation quantity based on the second interest level.

An additional example embodiment in accordance with the innovations described herein may be a local commerce server system made up of a client interest profile module that receives interest information associated with a first plurality of clients and stores the interest information in a memory of the local commerce server system. Such a local commerce server system may additionally include a location determination module operating with one or more processors that receives first location information associated with a first plurality of client devices, wherein each device of the first plurality of client devices is associated with a client of the first plurality of clients. Such a local commerce server system may additionally include a geofencing module operating with the one or more processors that determines that the first plurality of client devices are within a first geographic area using the first location information associated with the first plurality of client devices. Such a local commerce server system may additionally include a local commerce module operating with the one or more processors that calculates an interest level for a first product from the interest information associated with the first plurality of client devices, identifies a threshold associated with the first geographic area and the first product, and determines that the interest level for the first product exceeds the threshold. Such a local commerce server system may additionally include a communication module coupled to the memory and the one or more processors that initiates a local commerce message associated with a first merchant in response to the determining that the interest level for the first product exceeds the threshold.

Additional implementations of such a local commerce server may further include a merchant local commerce application module that stores product information comprising product details for a plurality of products, bounding information associated with each product of the plurality of products, and threshold information associated with each product of the plurality of products, where the merchant local commerce application is configured to provide the product information to the local commerce module via a merchant input module of the local commerce server system.

An additional example embodiment may be a non-transitory computer readable medium comprising computer readable instructions that, when executed by one or more processors, cause a device to: receive, at the device, first location information associated with a first plurality of client devices; receive interest information associated with the first plurality of client devices; determine that the first plurality of client devices are within a first geographic area during a first time period using the first location information associated with the first plurality of client devices; calculate an interest level for a first product from the interest information associated with the first plurality of client devices; identify a threshold associated with the first geographic area and the first product; determine that the interest level for the first product exceeds the threshold; and initiate a local commerce message associated with a first merchant in response to the determining that the interest level for the first product exceeds the threshold.

While these and other example embodiments are specifically described herein, it will be apparent to a person of ordinary skill in the art that additional embodiments are possible within the scope of the innovations that are described herein and illustrated by the example embodiments.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Example embodiments may be implemented in digital electronic circuitry, or in computer hardware, firmware, software, or in combinations of these. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 10:
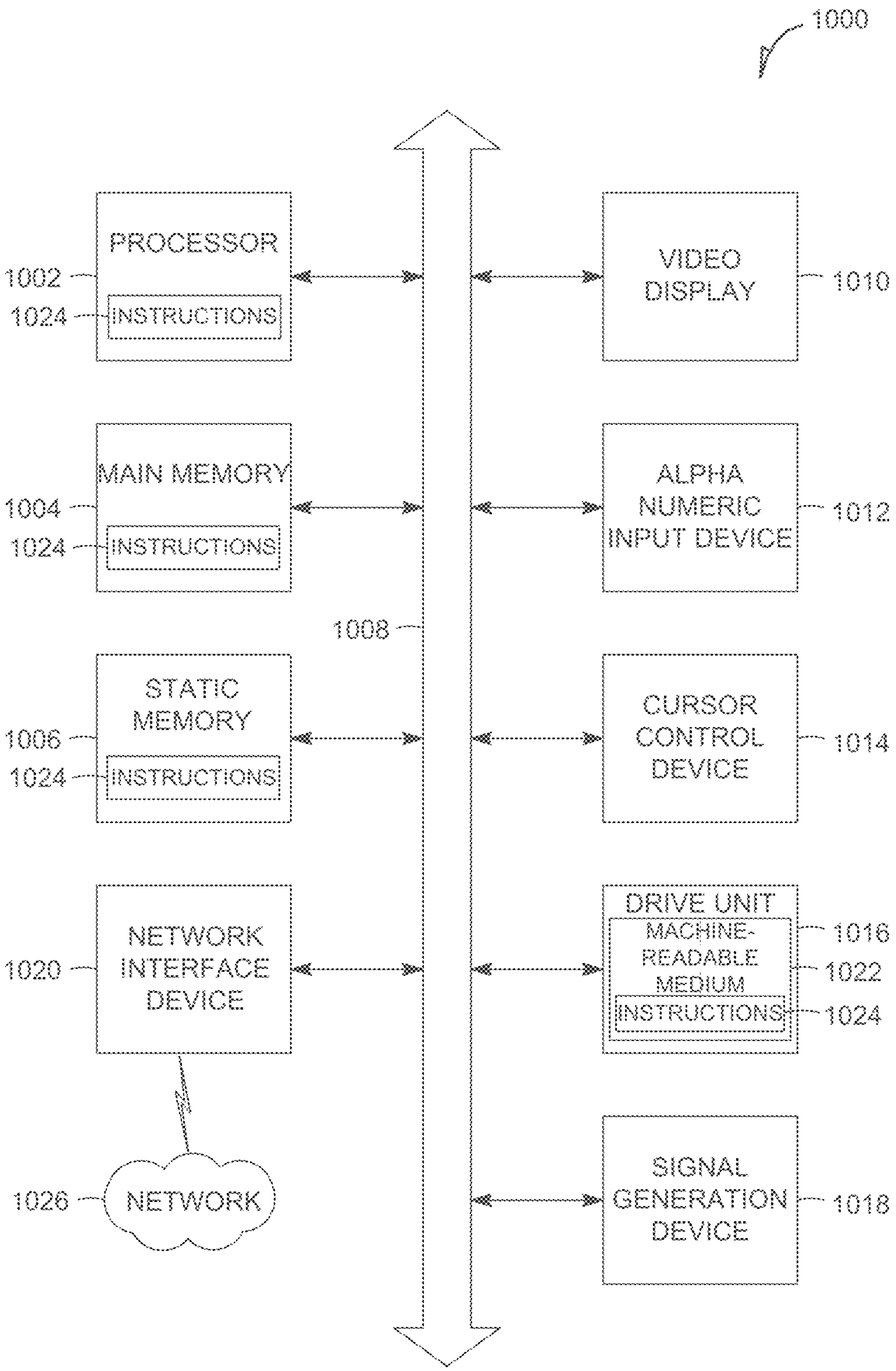
FIG. 10 is a diagrammatic representation of a machine in the example form of a computer system within which a set of instructions for causing the machine to perform any one or more of the methodologies discussed herein may be executed.

FIG. 10 is a block diagram of a machine in the example form of a computer system 1000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004 and a static memory 1006, which communicate with each other via a bus 1008. The computer system 1000 may further include a video display unit 1010 (e.g., a liquid crystal displays (LCD) or a cathode ray tube (CRT)). The computer system 1000 also includes an alphanumeric input device 1012 (e.g., a keyboard), a cursor control (client interface (UI) navigation) device 1014 (e.g., a mouse), a disk drive unit 1016, a signal generation device 1018 (e.g., a speaker), and a network interface device 1020.

The disk drive unit 1016 includes a non-transitory machine-readable medium 1022 on which is stored one or more sets of instructions and data structures (e.g., software) 1024 embodying or used by any one or more of the methodologies or functions described herein. The instructions 1024 may also reside, completely or at least partially, within the main memory 1004, static memory 1006, and/or within the processor 1002 during execution thereof by the computer system 1000, with the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present innovations, or that is capable of storing, encoding or carrying data structures used by or associated with such instructions. The term "machine-readable medium" shall accordingly be taken to include, but not be limited to, solid-state memories and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 1024 may further be transmitted or received over a communications network 1026 using a transmission medium. The instructions 1024 may be transmitted using the network interface device 1020 and any one of a number of well-known transfer protocols (e.g., hypertext transfer protocol). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the embodiments described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

I claim:

1. A system comprising:

at least one hardware processor; and a memory storing instructions that, when executed by the at least one hardware processor, cause the at least one hardware processor to perform operations comprising:

receiving bounding information associated with a local commerce event and information regarding a plurality of devices within a geographic boundary defined by the bounding information;

determining a first interest level based on interest information received from the plurality of devices;

in response to the first interest level being greater than or equal to a first threshold, sending an initial local commerce communication to the plurality of devices within the geographic boundary;

receiving, from at least one device of the plurality of devices, feedback in response to the initial local commerce communication;

determining a second interest level by updating the first interest level based on the feedback; and in response to the second interest level being greater than or equal to a second threshold, causing an event application on an event provider server to initiate the local commerce event at a location within the geographic boundary.

2. The system of claim 1, wherein the location comprises a first location, and wherein the operations further comprise:

determining that an on-demand local store is to be initiated;

receiving, via the event application, data specifying a second location corresponding to a device of the plurality of devices; and in response to determining that the second location is outside of the geographic boundary, sending, via the event application, an electronic communication to the device, the electronic communication indicating that the on-demand local store is to be initiated, wherein the local commerce event comprises the on-demand local store.

3. The system of claim 2, wherein the operations further comprise determining, based on the data received from the event application, that the device was previously within the geographic boundary for a predetermined amount of time.

4. The system of claim 2, wherein the device elected to receive the electronic communication.

5. The system of claim 1, wherein the first threshold or the second threshold is a dynamic threshold that dynamically changes based on a time of day.

6. The system of claim 1, wherein the operations further comprise assigning a first weight to first interest information from a first device of the plurality of devices and a second weight, different than the first weight, to second interest information from a second device of the plurality of devices.

7. The system of claim 6, wherein the first weight and the second weight are based on a proximity to a fixed point within the geographic boundary.

8. The system of claim 7, wherein the first weight and the second weight are based on a time of day.

9. The system of claim 1, wherein the location comprises a first location, and wherein the operations further comprise:

receiving, from the at least one device, location information that indicates a second location associated with the at least one device, wherein the second location is outside of the geographic boundary; and sending, to the at least one device, an electronic communication that indicates the local commerce event is initiated.

10. A method comprising:

receiving, by one or more hardware processors, bounding information associated with a local commerce event and information regarding a plurality of devices within a geographic boundary defined by the bounding information;

determining a first interest level based on interest information received from the plurality of devices;

in response to the first interest level being greater than or equal to a first threshold, sending an initial local commerce communication to the plurality of devices within the geographic boundary;

receiving, from at least one device of the plurality of devices, feedback in response to the initial local commerce communication;

determining a second interest level by updating the first interest level based on the feedback; and in response to the second interest level being greater than or equal to a second threshold, causing an event application on an event provider server to initiate the local commerce event at a location within the geographic boundary.

11. The method of claim 10, wherein the location comprises a first location, and wherein the method further comprises:

determining that an on-demand local store is to be initiated;

receiving, via the event application, data specifying a second location corresponding to a device of the plurality of devices; and in response to determining that the second location is outside of the geographic boundary, sending, via the event application, an electronic communication to the device, the electronic communication indicating that the on-demand local store is to be initiated, wherein the local commerce event comprises the on-demand local store.

12. The method of claim 11, further comprising determining, based on the data received from the event application, that the device was previously within the geographic boundary for a predetermined amount of time.

13. The method of claim 11, wherein the device elected to receive the electronic communication.

14. The method of claim 10, wherein the first threshold or the second threshold is a dynamic threshold that dynamically changes based on a time of day.

15. The method of claim 10, further comprising assigning a first weight to first interest information from a first device of the plurality of devices and a second weight, different than the first weight, to second interest information from a second device of the plurality of devices.

16. The method of claim 15, wherein the first weight and the second weight are based on a proximity to a fixed point within the geographic boundary.

17. The method of claim 16, wherein the first weight and the second weight are based on a time of day.

18. A non-transitory computer-readable medium storing executable instructions thereon, which, when executed by at least one processor, causes the at least one processor to perform operations comprising:

receiving bounding information associated with a local commerce event and information regarding a plurality of devices within a geographic boundary defined by the bounding information;

determining a first interest level based on interest information received from the plurality of devices;

in response to the first interest level being greater than or equal to a first threshold, sending an initial local commerce communication to the plurality of devices within the geographic boundary;

receiving, from at least one device of the plurality of devices, feedback in response to the initial local commerce communication;

determining a second interest level by updating the first interest level based on the feedback; and in response to the second interest level being greater than or equal to a second threshold, causing an event application on an event provider server to initiate the local commerce event at a location within the geographic boundary.

19. The non-transitory computer-readable medium of claim 18, wherein the operations further comprise:

determining that an on-demand local store is to be initiated;

receiving, via the event application, data specifying a second location corresponding to a device of the plurality of devices; and in response to determining that the second location is outside of the geographic boundary, sending, via the event application, an electronic communication to the device, the electronic communication indicating that the on-demand local store is to be initiated, wherein the local commerce event comprises the on-demand local store.

20. The non-transitory computer-readable medium of claim 19, wherein the operations further comprise determining, based on the data received from the event application, that the device was previously within the geographic boundary for a predetermined amount of time.

* * * * *